May 29, 1934.　　　A. L. SHAW ET AL　　　1,961,082
GLASS CUTTING MACHINE
Filed May 25, 1933
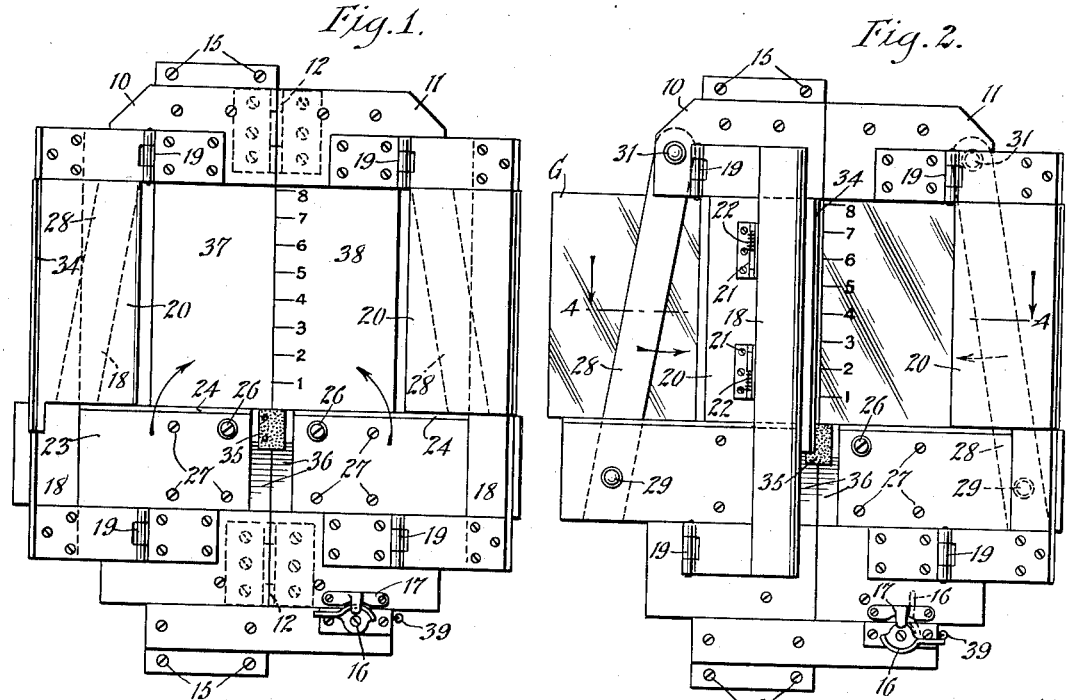
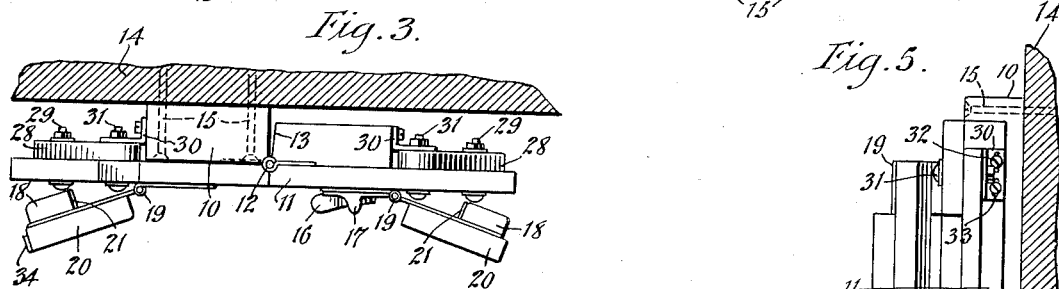
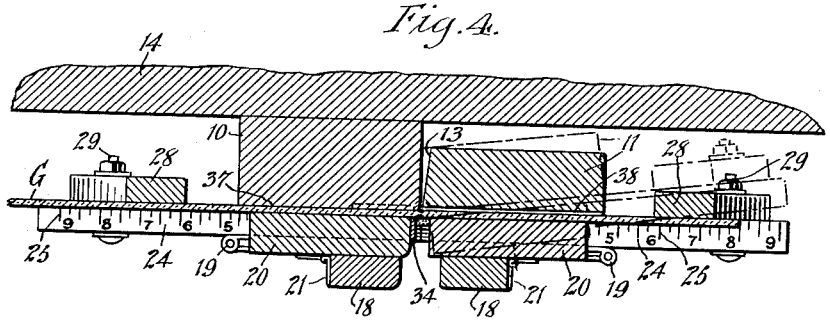
WITNESSES
Edw. Thorpe
Chris Feinle.
INVENTORS
Albert L. Shaw
Emma J. Shaw
BY
ATTORNEY Patented May 29, 1934

1,961,082

UNITED STATES PATENT OFFICE 1,961,082

GLASS CUTTING MACHINE

Albert L. Shaw and Emma J. Shaw, Corinne, Utah

Application May 25, 1933, Serial No. 672,876

5 Claims. (Cl. 49—48)

This invention relates to a device for cutting glass or other material, and more particularly the invention relates to a device such as that disclosed in United States Letters Patent No. 1,479,748.

The invention resides in the improvements and their advantages hereinafter fully described and illustrated in the accompanying drawing, in which Figure 1 is a front view of a device embodying the features of the invention, the clamps being shown swung to opened position;

Fig. 2 is a view similar to Fig. 1, but showing one of the clamps closed upon the glass to firmly hold it for the cutting operation;

Fig. 3 is a top view of the device with the parts in the relation shown in Fig. 1, and said device being shown secured to a suitable support appearing in section;

Fig. 4 is an enlarged section taken on the line 4—4 of Fig. 2;

Fig. 5 is a side view of the device with the parts in the relation shown in Fig. 1;

Fig. 6 is a fragmentary horizontal section illustrating the manner in which the cut glass is broken.

Referring now more particularly to the several views of the drawing, it will be apparent that the device includes frame structures or sections 10 and 11, which are hingedly connected together by hinges 12 whose pintles are in axial alignment so that the section 11 may have a slight movement relatively to the section 10. The hinged edge of the section 11 is beveled, as at 13, for this purpose. The swinging of the section 11 relatively to the section 10 is for the purpose of breaking off cut glass after the cutting or scoring operation, particularly when comparatively thick or heavy plate glass is cut or scored. The device may be used advantageously in a vertical position and will be secured or anchored to a suitable support 14, by fastening elements, such as screws 15, which pass through the section 10 and driven into the support 14. Therefore, it will be apparent that the section 10 will be held stationary or fixed.

Suitable fastening means is provided to hold the section 11 from movement on the hinges 12 with respect to the section 10. The said means consists of a turnable element 16 on the section 10 and a coacting fastener element 17 on the section 11. The section 16 may be turned into and out of engagement with the element 17 to hold and release the section 11. Each of the sections 10 and 11 has connected therewith similar clamping means to firmly hold the glass G on the sections 10 and 11. The clamping means for each section consists of a bar 18, which is hingedly connected with the related section by strap hinges 19, whose pintles are in axial alignment so that the bar 18 will swing in an arc with said pintles as centers. The screw holes in the leaves of hinges 19 may be elongated for adjusting the hinges if necessary. A flat clamping element 20 is hingedly connected with the bar 18 by spring hinges 21, the spring of each hinge being designated 22. It will therefore be understood that the clamping element 20 is movable with the bar 18 and with respect thereto, which makes it possible to bring the element 20 parallel with and flat against the glass. Each of the sections 10 and 11 carries a block 23, the upper edge of which has secured thereto a strip 24 having a graduated scale 25 on the upper face. The strip 24 constitutes a ledge or rest for the lower edge of the glass, and the scale 25 serves for positioning the glass for the accurate cutting off of a desired portion of the glass. It is to be understood that the upper edge of the block 23 itself may constitute the rest or ledge for the lower edge of the glass, in which case the scale 25 will be applied to said upper edge.

In accordance with one feature of the invention, provision is made for holding each block 23 in the proper position to receive the lower edge of the glass G for the cutting operation and also to allow the block 23, together with one of the parts of the holding means, to be moved into compact positions with respect to the related section, so that the device may be shipped in a comparatively small package. Each block 23 is secured to the related section by a fastening element 26, which serves as a pivot on which the block 23 may be swung in the direction indicated by the arrow in Fig. 1. Each block 23 may also be secured by additional fastening elements, such as the screws 27, which are removed when it is desired to swing the block 23 to its folded position. Use is made of the brace 28 in conjunction with each block 23. One end of the brace 28 is connected with the block by a suitable fastening element 29, which is readily detachable. The other end of the brace is secured to a bracket 30 by a suitable fastening element 31 which serves as a pivot making it possible to swing the brace inwardly over the related section when the element 29 is detached. The bracket 30 is adjustably secured to the related frame section by screws 32 extending in slots 33 in the bracket. The brackets 30 make it possible to properly adjust the blocks 23.

A suitable guide 34 is secured on the edge of the clamping element carried by the section 10 so as to lie coincidental with the hinge joint between the sections 10 and 11 when said clamping element 20 is closed upon the glass to be cut or scored. The section 10 has secured thereto a leather or other resilient stop 35 to protect the lower edge of the glass as the cutter leaves the glass, and stops the cutter after it passes from the glass in the cutting operation. Means 36 is secured to the sections 10 and 11 below the stop 35 to deflect the material removed in cutting or scoring the glass.

In accordance with an improved feature of the invention, the section 10 provides a flat surface 37, against which the glass may bear under the pressure of the related clamping element 20. The section 11 also provides a flat surface 38, against which the cut portion of the glass may bear when subjected to the pressure of the related clamping element 20. The surface 38 is disposed slightly rearwardly offset with respect to the surface 37, or, in other words, is not flush with the surface 37, for a purpose to appear.

When it is desired to cut off a desired portion from a piece of glass, the said piece is arranged on the section 10 with the lower edge thereof resting on its strip 24 properly positioned for the accurate cutting or scoring. The clamping element 20 of the section 10 is then swung into contact with the piece of glass to firmly hold the same in contact with the surface 37. A suitable cutting tool is then passed along the guide 34 to score or cut the glass. Pressure is exerted with the left hand on the bar 18 of the section 10 to hold its clamping element 20 in contact with the glass, and, at the same time, the bar 18 of the section 11 is gripped between the thumb and fingers of the right hand and is swung to cause the clamping element 20 to strike the cut portion of the glass breaking the same along the line scored or cut, and the cut portion will be clamped between the clamping element and the surface 38. The two portions of the glass may be readily removed by swinging back the clamping elements and then sliding the two portions of the glass from the device.

If desired, the cut-off portion of the glass may be broken along the line of scoring by releasing the fastening element 16, so that the section 11 may be moved relatively to the section 10 on the hinges 12, as indicated by dot-and-dash lines in Fig. 4. This expedient may be desirable when more than four inches of any thickness of glass is to be trimmed from a piece of glass.

In order to return the section 11 to a normal position with respect to the section 10, there is provided a coil spring 39, which has the opposite ends thereof connected, respectively, with the sections 10 and 11.

The fastener element 17 is so formed that the element 16 may be turned to the position indicated in dotted lines in Fig. 2, to hold the section 11 back in the position indicated in dot-and-dash lines in Fig. 4. This gives more clearance for knocking off narrow strips of glass along the line of scoring. Strips of glass less than four inches in width may be knocked off in this manner.

What we claim is:

1. A device for cutting glass including a stationary structure providing a rest for one edge of the glass and also providing a surface against which one face of the glass may bear while being cut, a structure providing a fixed surface adjacent said first surface and slightly rearwardly offset with respect to the latter, and means movable relatively to said offset surface to break off the cut glass and to clamp the same therebetween.

2. A device for cutting glass including a stationary structure providing a rest for one edge of the glass and also providing a surface against which one face of the glass may bear while being cut, a structure providing a fixed surface adjacent said first surface and slightly rearwardly offset with respect to the latter, and means having a hinge connection with said second structure permitting swinging of said means relatively to said offset surface to break off the cut glass and to clamp the same therebetween.

3. A device for cutting glass including a stationary structive providing a rest for one edge of the glass and also providing a surface against which one face of the glass may bear while being cut, a structure providing a fixed surface adjacent said first surface and slightly rearwardly offset with respect to the latter, and an impact member movable relatively to said offset surface, said impact member having a flat surface which is impacted against the surface of the cut glass upon the movement of the impact member to break off the cut glass and to clamp the same therebetween.

4. A device for cutting material including a structure providing a surface against which the material to be cut may bear for cutting, a rest member, means carried by said structure to hold said rest member in position to accommodate an edge of the material while bearing against said surface, said means including a fastener which serves as a pivot for the rest member, a brace, a second fastener connecting one end of the brace with said structure and also serving as a pivot therefor, and a third fastener connecting the remaining end of said brace with the rest member, said third fastener being detachable to allow said rest member and the brace to pivot into compact positions in relation to said structure.

5. A device for cutting glass including a stationary structure providing a rest for one edge of the glass and also providing a surface against which one face of the glass may bear while being cut, a structure providing a fixed surface adjacent said first surface and slightly rearwardly offset with respect to the latter, a handle having a hinge connection with said second structure permitting swinging of the handle toward and away from said offset surface, and an impact member having a resilient connection with said handle, so that when said handle is swung toward said offset surface, said impact member will be impacted against the cut glass to break it off.

ALBERT L. SHAW.
EMMA J. SHAW.